United States Patent [19]

Thomas et al.

[11] Patent Number: 5,091,096
[45] Date of Patent: Feb. 25, 1992

[54] MARINE OIL SPILL RECOVERY APPARATUS AND METHOD

[75] Inventors: Lynn E. Thomas; Wilfred J. Waisath, Jr., both of Houston, Tex.

[73] Assignee: Alliance Industries, Inc., Houston, Tex.

[21] Appl. No.: 680,415

[22] Filed: Apr. 4, 1991

[51] Int. Cl.[5] ............................................. C02F 1/40
[52] U.S. Cl. .................................... 210/744; 210/97; 210/122; 210/143; 210/170; 210/242.3; 210/747; 210/776; 210/923
[58] Field of Search ............... 210/776, 86, 97, 143, 210/242.3, 747, 170, 122, 923, 741, 744

[56] References Cited

U.S. PATENT DOCUMENTS

| | | | |
|---|---|---|---|
| 3,578,171 | 5/1971 | Usher | 210/923 |
| 3,730,346 | 5/1973 | Prewitt | 210/242.3 |
| 4,108,773 | 8/1978 | Macaluso | 210/242.3 |
| 4,394,265 | 7/1983 | van Drimmelen et al. | 210/923 |

Primary Examiner—W. Gary Jones
Attorney, Agent, or Firm—Marvin J. Marnock

[57] ABSTRACT

A method and apparatus for recovery of oil from a marine oil slick. The apparatus includes a dredge (10) equipped with a suction pump (11) and a suction pipe (13) having a suction collector box (17,60) mounted on the distal end thereof for pivotal movement with respect to said pipe. The dredge is positioned adjacent the oil slick with the collector box in the current path by means of the anchor lines (32a,33a). Drive controls, which may include an automatic positioning system (75), are provided to maintain the lip (20) of the opening at a selected level of submergence along a plurality of incremental lengths of said lip comprising substantially its entire length to accommodate wave action incident from any direction. A plurality of oil/water separation devices (44) mounted on barges (45) or other convenient platforms connect with the pump outlet to receive the mixture of oil and water suctioned through the collector box and to separate the oil and water for collection.

16 Claims, 5 Drawing Sheets

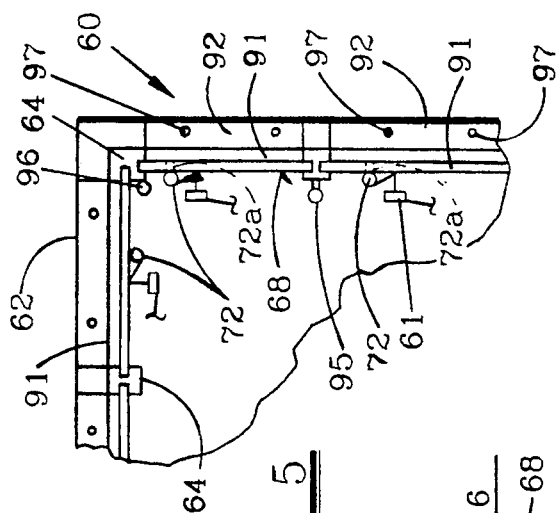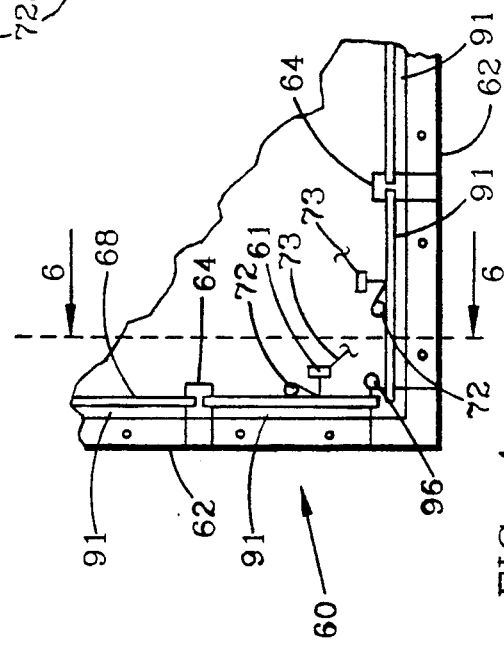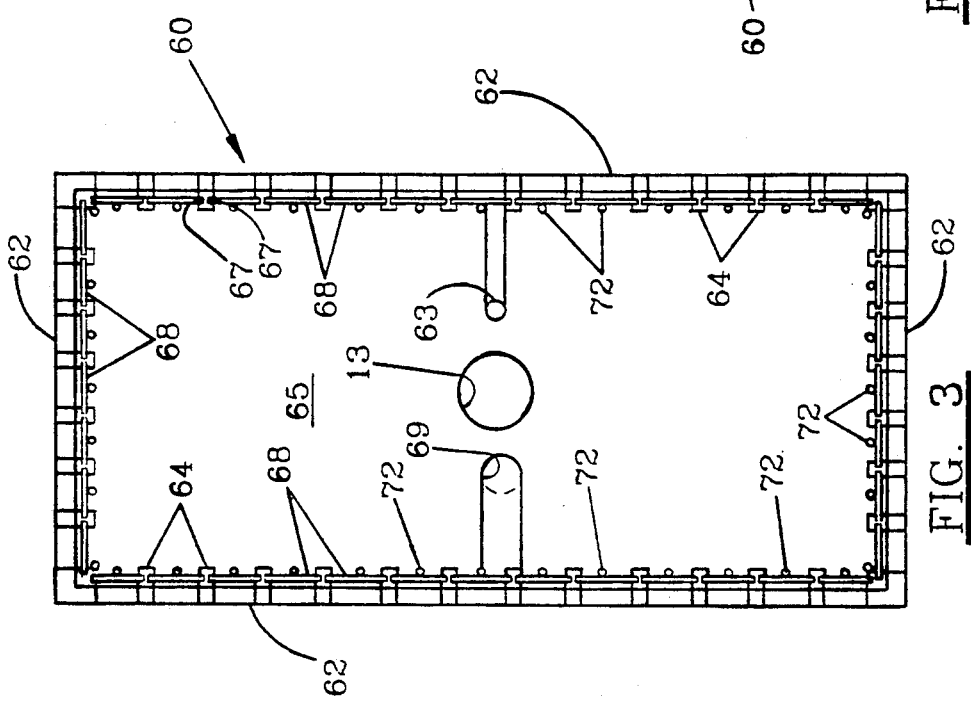

5,091,096

MARINE OIL SPILL RECOVERY APPARATUS AND METHOD

FIELD OF THE INVENTION

The invention relates to a method and apparatus for the recovery of oil from a marine oil slick and more particularly, to a method and apparatus wherein a dredge with a suction line equipped at its distal end with a suction collector box with an open top is positioned with the collector box directly below the oil slick for suctioning water and oil downward from the marine surface and delivering the mixture to oil/water separators for the separation and collection of oil.

BACKGROUND OF THE INVENTION

The calamitous effects of marine oil spills have led to the development of a variety of oil spill containment and recovery means and methods. However, the vast sizes of large spills have created an urgent need for oil spill recovery techniques by which it will be possible to clean up larger volumes of oil in a shorter time than has heretofore been achieved. For current techniques which employ chemical and biological means as well as physical recovery apparatus, such as skimmers, absorbers, hydrocyclone separators and the like, the ability to recover large volumes of oil in a short time is still an elusive goal.

SUMMARY OF THE INVENTION

The present invention relates to a method and apparatus for the rapid recovery of large volumes of oil from a marine oil slick. The apparatus of the invention includes a dredge with a high volume suction pump and suction pipe connected thereto with a connection which allows pivotal movement of the pipe for submergence. A suction collector box with an open top and a lip defined by the edge of the box about the opening is mounted adjacent the distal end of the suction pipe for pivotal movement with respect to the pipe. To commence operations, the dredge is positioned adjacent the oil slick by means of anchor lines with the collector box and dredge directly facing the on-coming current and the current-carried oil slick. By means of winches, an operator controls the positioning of the suction pipe and collector box relative thereto in order to place the collector box directly below the oil slick at a predetermined level of submergence. The operator continuously monitors and maintains the submergence level of the lip of the box and by energizing the pump, a suction pressure is applied for suctioning a mixture of water and oil from the slick through the collector box, suction pipe and pump. The discharge outlet of the pump is connected by a conduit to the inlets of one or more oil/water separation devices mounted on adjacent barges or located on land or off-shore platforms. Discharge conduits connecting with outlets of the separation devices are provided for conveying the separated oil to storage tanks and returning the separated water to the sea or other body of water. For operation in rough seas, a modified form of collector box is provided with an adjustable lip and automatic controls for maintaining the lip at the predetermined level of submergence.

BRIEF DESCRIPTION OF THE DRAWINGS

FIG. 3 is a top plan view of a modified form of suction collector box which can be employed in the apparatus of FIGS. 1 and 2, wherein seals shown in FIGS. 4 and 5 are omitted for clarity;

FIG. 4 is an enlarged fragmentary top plan view of a corner of the collector box of FIG. 3;

FIG. 5 is an enlarged fragmentary side view of a second corner portion of the collector box of FIG. 3;

DETAILED DESCRIPTION OF THE INVENTION

Figure 1:
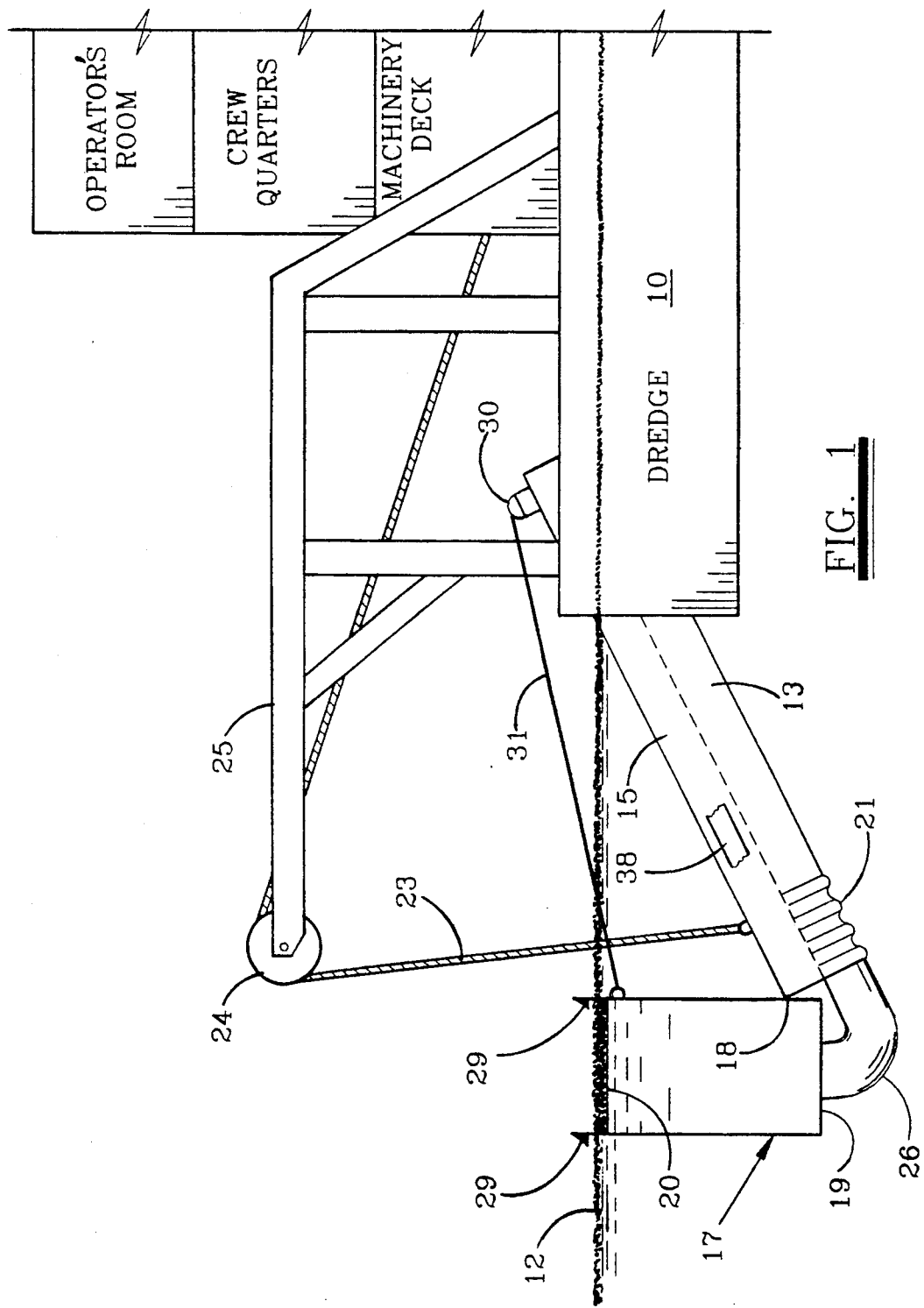
FIG. 1 is a fragmentary side view of a dredge in an embodiment of the apparatus of the invention which comprises the dredge with a suction pipe pivotally mounted thereon and an open top suction collector box mounted adjacent the end of the suction pipe for pivotal movement relative thereto with winches on the dredge for positioning and maintaining the collector box in upright orientation with the lip of the box opening at a selected level of submergence.
Figure 2:
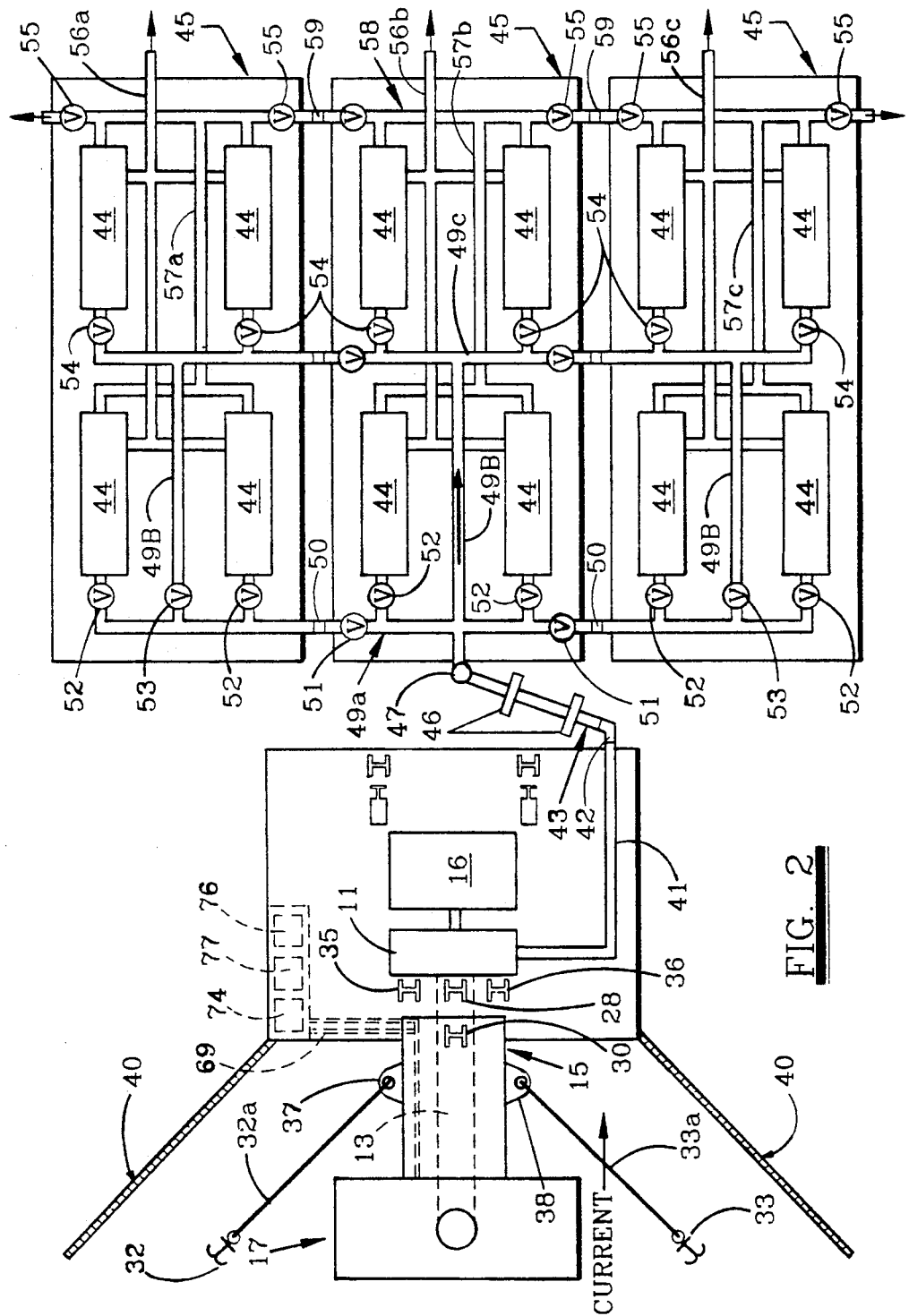
FIG. 2 is a top plan schematic view of the embodiment of the invention shown in FIG. 1 with parts of the dredge omitted for clarity and showing three barges astern of the dredge with a plurality of oil/water separators mounted on the barges and connected by conduit means to the discharge outlet of a suction pump of the invention.

Referring more particularly to the drawings, there is shown in FIGS. 1 and 2, a suction dredge 10 which is equipped with a suction pump 11 and a suction pipe 13 connected to the inlet of the pump The suction pipe 13, along its length, is fastened to a rigid ladder 15 which provides support for the pipe. As with conventional suction dredges, the ladder 15 and suction pipe 13 are mounted at the bow of the dredge for pivotal movement in a vertical plane to allow the submergence of the suction pipe. A Diesel engine prime mover 16 provides a variable speed control for the pump and therefore a variable control of the suction pressure.

A suction collector box 17 with an open top is connected by a hinge 18 to the end of the ladder 15 for pivotal movement thereon. The bottom 19 of the collector box is provided with a central opening in fluid communication with the distal end of suction pipe 13 by a flexible hose 21 and steel elbow 26 which connects the box 17 and suction pipe 13. Typical dimensions for the box 17 are 40 ft. (12.19 m) by 20 ft. (6.096 m) in horizontal cross section and a height of 13 ft. (3.962 m).

For raising and lowering the suction pipe 13, a wire rope 23 is attached to the ladder 15 adjacent its distal end. The wire rope 23 is spooled about a pulley 24 on the end of an A-Frame 25 and wound about a winch 28 located on the main deck of the dredge 10. A collector box leveling winch 30 with a wire cable 31 is mounted at the end of the ladder 15 remote from the collector box 17. The cable 31 is attached to the top end of the collector box and when reeled in or out controls the vertical orientation of the collector box and its pivotal relation to the ladder 15.

In preparing to commence operations for cleaning up an oil slick, such as the slick 12 in FIG. 1, and recovering the oil from the slick, the dredge 10 is towed, or self-propelled, to a location adjacent the edge of the oil slick. By dropping a pair of anchors 32,33 by means of respective windlasses 35,36 mounted on opposite sides of the winch 28 the dredge is positioned with the suction pipe 13 and collector box 17 between it and the oil slick so as to face the oncoming current. More precise head-on positioning of the dredge and collector box is then achieved by retrieving or releasing either or both of the anchor lines 32a,33a to the anchors 32,33. Preferably, the respective anchor lines 32a,33a are passed over swing sheave tables 37,38 mounted on opposite sides of ladder 15.

For proficient operation, it is desirable that the lip 20, as defined by the edge of the collector box about its top opening, is maintained at an optimum level of submergence below the water-oil interface. A submergence of approximately two inches below the interface is desirable to avoid less than maximum rate of recovery of oil. The lip 20 may be lowered an additional short distance to avoid losing suction with very thin oil thicknesses. The operator relies principally on visual observance of the lip 20 of the box 17 to operate the winches 28 and 30 and to maintain the lip 20 in horizontal orientation at the prescribed level of submergence. Since the lip 20 may be obscured by the oil slick, four indicator flags 29, each mounted on flag sticks approximately 18 inches (45.7 cm) in height, with ruled graduations at every inch (2.54 cm) of height are erected at the four corners of the collector box for easy observance by the operator. With information as to the thickness of the oil slick obtained by sampling, the operator can then observe the graduations to compensate for the oil thickness in placing the lip of the collector box at the desired level below the oil-water interface.

The discharge end of the pump 11 is connected to a discharge conduit 41 which leads to the stern of dredge. The water and oil from the slick which is suctioned through the collector box 17, suction pipe 13, and pump 11, are conveyed through the discharge conduit 41 to a plurality of oil/water separation devices 44 which are mounted on three barges 45 located adjacent the stern of the dredge 10.

As shown in FIG. 2, the barges 45 are arranged in side-by-side relation and there are four oil/water separation devices 44 arranged in front and rear pairs on each of the barges 45.

The end of the discharge conduit 41 at the stern of the dredge 10 is joined by a swivel connection 42 to a floating conduit 43 of approximately 50 ft. (15.24 m) in length which is supported on pontoons 46 and connects by a swivel connection 47 with an inlet manifold 49A in communication with the respective inlets of each of the oil/water separation devices 44 in the three front pairs of separation devices. The inlet manifold 49A which is supported by the three barges 45 includes flexible rubber sections 50 in the portions of the manifold between the barges.

The oil/water separation devices 44 are of conventional commercially available type and are of sufficient number to be capable of handling the discharge from the pump. It is preferred that each of the separation devices 44 be capable of handling as much as 100,000 barrels a day of the pump discharge. It is also to be understood that while the separation devices are shown mounted on three barges, they could as well be located on any convenient platform such as the dredge itself or on any number of barges.

A pair of valves 51 are installed in the inlet manifold 49A on the portion thereof which is carried on the central barge. The valves 51, which may be manually or automatically controlled, are placed on opposite sides of the manifold inlet which receives the discharge from the pump and provide safeguards to a rupture of the manifold 49A as might occur at its flexible rubber sections 50 in heavy seas. In addition, similar valves 52 are installed directly before the inlets to each of the oil/water separation devices 44.

The inlet manifold 49A connects by branch conduits 49B with an inlet manifold 49C coupled to the inlets of each of the three rear pairs of separation devices 44. Three branch conduits 49B are also mounted on the barges, one conduit 49B for each barge, and in each is installed a valve 53 for controlling flow to the inlet manifold 49C. Valves 54 are installed directly before the inlets to each of the oil/water separation devices 44 in the rear pairs of devices 44.

The discharge outlets for separated water from the four separation devices 44 on each barge are joined to a common water discharge line, such as the discharge lines 56a,56b, and 56c on the respective barges, from which the separated water is discharged into the sea. In similar fashion, the discharge outlets for oil from the four separation devices 44 on each barge are joined to a common oil discharge line, such as the discharge lines 57a,57b and 57c on the respective discharge conduits 57a,57b barges. However, the ends of and 57c connect with a common outlet manifold 58 which connects across the barges by flexible rubber connections 59. The recovered oil from all of the separation devices is then conveyed through the oil outlet manifold 58 to appropriate connections (not shown) leading to oil collector storage tanks which may be located on a tanker or tanker barges placed alongside the barges or at locations on land or on nearby platforms. As a safeguard, a pair of valves 55 are installed in the ends of each section of the outlet manifold 58 mounted on each of the barges.

It is to be noted that with a dredge with a suction pipe of 30 inch (76.2 cm) diameter and pump discharge pipe of 27 inch (68.58 cm) diameter, approximately one million barrels of liquid per day can be suctioned through the dredge suction pipe and delivered to the oil/water separators 44. However, the amount of oil which is separated and recovered in a given time will depend largely on the consistency with which the operator can maintain the lip of the collector box in a horizontal orientation and in close proximity to the marine surface at the desired level of submergence.

In the event there is a relatively strong current, it becomes desirable to retain as much as possible of the current-carried oil slick in proximity to the collector box and its suction. Accordingly, a pair of elongate oil retainer floats 40 of substantially linear configuration similar to booms are provided, each being pivotally connected at one end to the bow of the dredge 10 at connecting points on opposite sides of the suction pipe 13. The retainer floats are deployed in any suitable fashion to extend from the dredge 10 in a divergent angular relationship to one another at an angle selected to intercept and retain as much of the oil slick as is practicable. The retainers are maintained in position by anchors and anchor lines fixed to their far ends. The retainers 40 could each be as long as a mile (approximately 1.6 km) or more and spread far apart for intercepting and retaining large quantities of the oil slick.

In the event of rough seas, it becomes an impossibility for the operator to maintain the lip of the collector box at the desired level of submergence below the surface of the oil slick. Accordingly, a modified form of the collector box, illustrated in FIGS. 3 through 6, is devised for use in high seas as a replacement for the collector box of FIG. 1. In the collector box 60 of FIG. 4, the lip of the box is adapted to rise and fall to follow the wave action, such that the lip, throughout its full extent, is automatically controlled to track the surface of the water at the desired level of submergence.

Figure 6:
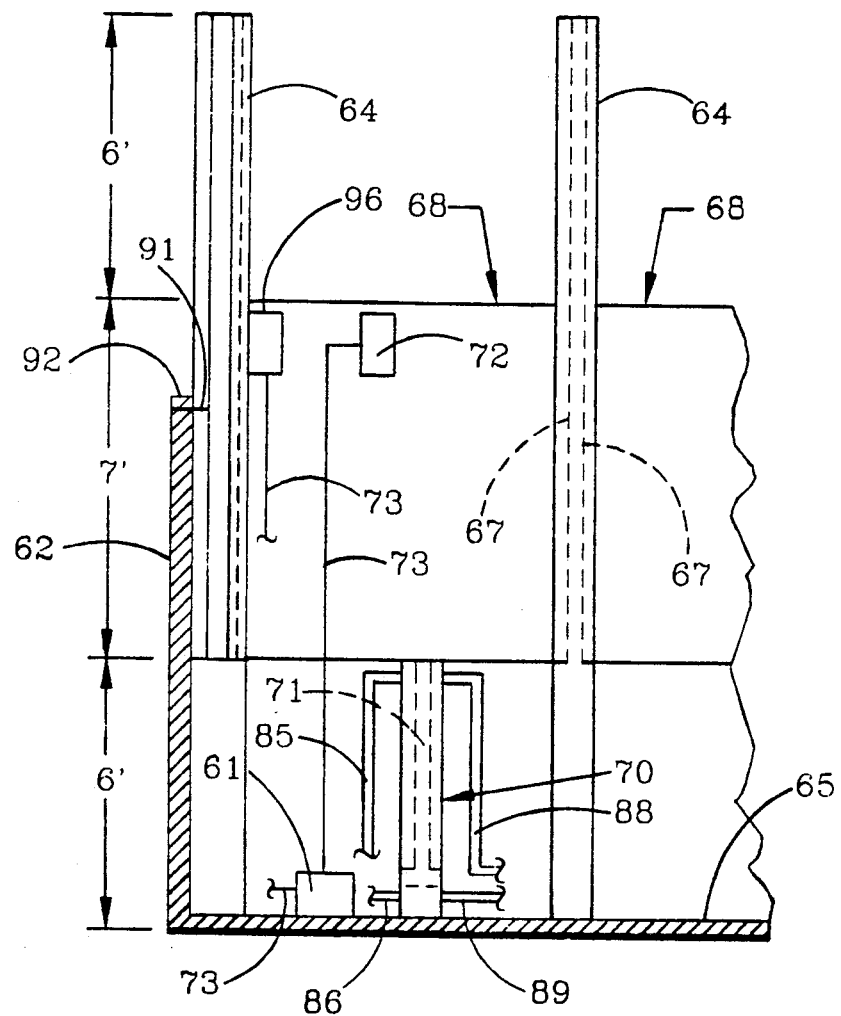
FIG. 6 is an enlarged fragmentary side view from inside the collector box of FIG. 3 as taken along section line 6—6 in FIG. 4, showing a riser plate which is mounted to an inside wall of the collector box and adapted for up-and-down movement by a linear hydraulic actuator.
Figure 7:
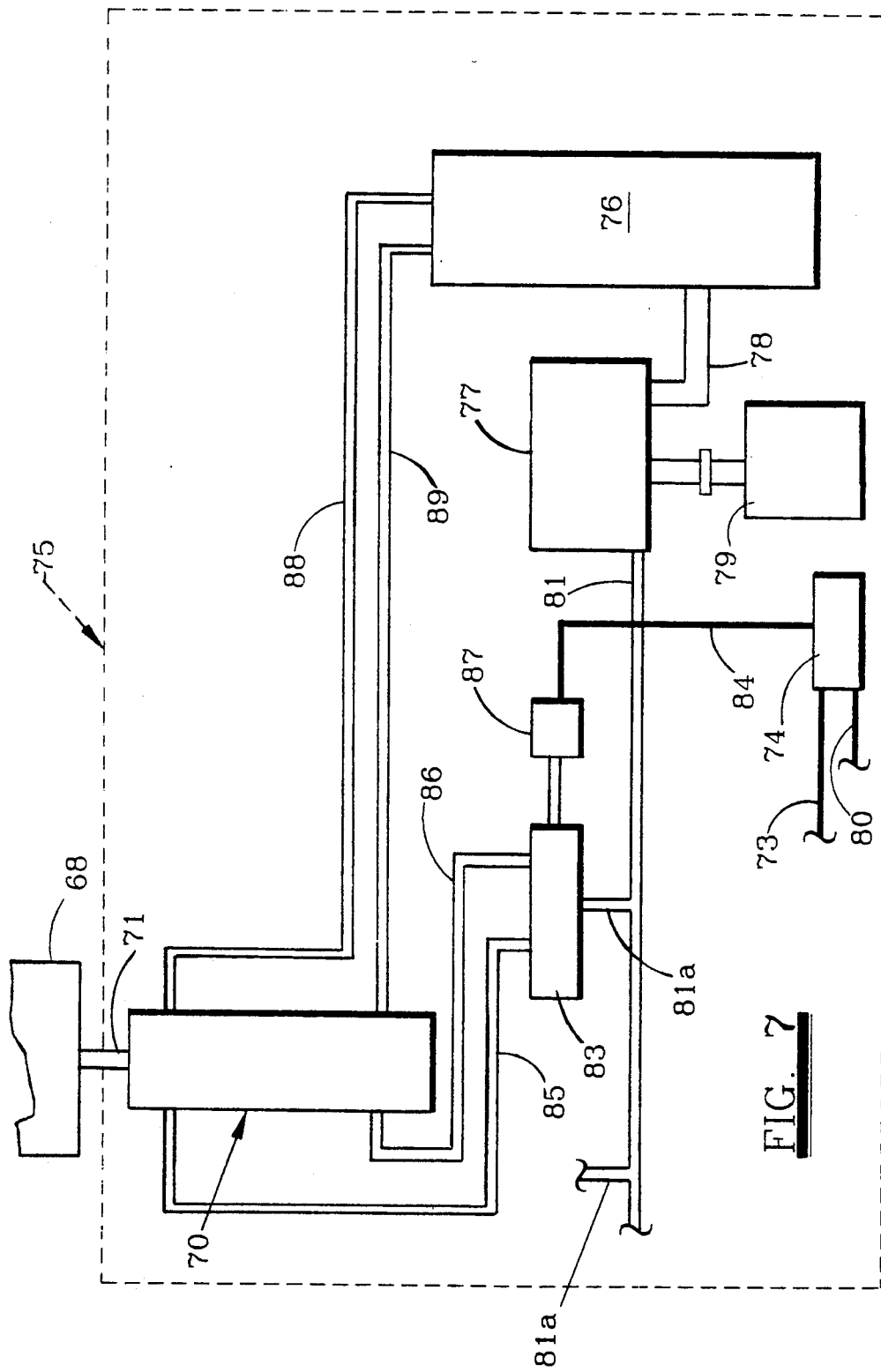
FIG. 7 is a schematic block diagram of a hydraulic controls system which is responsive to electrical output signals from hydrostatic pressure sensors fixed to riser plates in the collector box of FIG. 3 whereby the top edges of the riser plates are moved to follow the rise and fall of the marine surface.

As shown in FIGS. 3-6, the collector box 60 is designed with side walls 62 which provide a rectangular box cross section of approximately 40 ft. (12.192 m) by 20 ft. (6.096 m) with a wall height slightly greater than 12 ft. (3.657 m). In FIG. 3, for purposes of illustration, the riser plates 68, side walls 62 and the guide bars 64 are shown to be thicker in cross section than is normally the case. Affixed along the inner surfaces of the four side walls 62 are a plurality of elongate guide bars 64 which extend vertically in uniform spaced array from the floor 65 of the collector box to a height of 7 ft., approximately 2.13 m above the top edges of the side walls. Each guide bar 64, approximately 19 ft. (5.791 m) in length, is formed with channel grooves 67 which extend along opposite sides of the bar for its full length, except for four of the guide bars located at the corners of the box wherein the channel grooves 67 are formed in the intersecting inward facing sides of the bar. The facing grooves 67 of each pair of adjacent bars 64 serve to receive the side edges of a riser plate 68 inserted therein for accommodating up and down sliding movement of the riser plate. Thirteen such riser plates, each of 3 ft. (0.914 m) width and 7 ft. (2.133 m) length are installed along each of the 40 ft. (12.192 m) sides of the box in closely spaced relation thereto. In addition seven riser plates 68, each of approximately 2 ft. 9 inches (0.838 m) in width and 7 ft. (2.133 m) in length, are installed along each of the 20 ft. (6.096 m) sides of the box. As shown in FIG. 6, each of the riser plates 68 is connected at its bottom edge to an actuating element 71 of a linear hydraulic actuator 70 located directly below. Each of the hydraulic actuators 70 is fixed at one end to the floor 65 of the collector box and is capable of providing a six foot (approximately 1.83 m) linear stroke of its actuating element. When the collector box 60 is in a calm sea and the actuating elements 71 are in fully retracted position, the tops of the riser plates extend one foot (30.48 cm) above the top edges of the side walls 62. Near the top of each riser plate 68, as best shown in FIG. 6, there is located a hydrostatic pressure sensor 72 of a commercially available type such as the Model HTG-880 sensor with associated 834 DP Electronic Low-Range Differential Pressure Transmitter marketed by the Foxboro Company which is capable of sensing a hydrostatic head of a very few inches and providing an electrical indication thereof. The sensor 72 is mounted to the inner wall of the riser plate 68 by welding or the like at a location which is always above the tops of the side walls 62. As shown in FIG. 5, the sensor 72 is exposed to the outside water pressure through an opening 72a in the riser plate above the wall 62. In addition, electrical leads 73 are provided for coupling the sensor output signal to a computer 74 in a hydraulic controls system 75 as illustrated in FIG. 7. The leads 73 extend downwardly along the riser plate and are wound as a cable about its own spring retractable spool 61 to accommodate the up and down movement of the riser plates. The leads 73 from all the riser plates are gathered in a common duct 63 which passes along the floor of the collector box to an accommodating opening in the floor of the collector box and along the ladder 15 to the deck of the dredge 10.

The hydraulic controls system 75 includes a reservoir 76 of hydraulic fluid and a hydraulic pump 77 having an inlet coupled to an outlet conduit 78 of the reservoir 76. The pump 77 is driven by an electric motor 79 and is provided with an outlet manifold 81 having a plurality of branch conduits 81a, each of which connects with an actuator control valve 83. For each of the hydraulic actuators 70 for each of the riser plates 68, there is provided its own individual actuator control valve 83 to which it is connected by a pair of high pressure hydraulic lines 85,86. It is to be understood that each riser plate 68 in addition to its hydraulic actuator 70 and its own actuator valve 83, is also provided with its own solenoid 87, with each solenoid being individually electrically coupled to the computer 74 and each hydraulic actuator 70 provided with its own pair of hydraulic return lines to the reservoir 76. Operation of each actuation control valve 83 is controlled by the computer 74, which is programmed to respond to each sensor output signal and deliver command signals over each conductor 84 to each electric solenoid 87 operatively associated with a valve 83.

The valve 83 is controlled by the computer signal to deliver pressurized hydraulic fluid to the high pressure hydraulic lines 85,86 which serve to provide input pressure to the hydraulic actuator 70 for driving the actuating element 71 in proportioned response to the sensor output signal. Each hydraulic actuator 70 is provided with a pair of hydraulic fluid return lines 88,89 which return fluid to the reservoir 76. While only one such pair of return lines is shown in FIG. 7, it is to be understood that all the actuators 70 have return lines to the reservoir 76. It is also to be noted that all of the hydraulic lines to and from the linear actuators 70 pass through a common duct 69 which extends along the floor of the collector box 60 through a floor opening and along the ladder 15 to the main deck of the dredge 10.

In calm seas, the collector box 60 performs in the same fashion as the collector box 17 in the embodiment of FIG. 1, with a level of submergence controlled by the operator. In the event of high seas, the hydrostatic pressure sensors 72 detect the rise and fall of the liquid surface and the hydraulic controls system 75 controls the positioning of each of the riser plates 68 in response to its associated pressure sensor. A second input 80 is also provided to the computer 74 as a manual control for compensating for thickness of the oil slick as determined by sampling. As described above, the controls are designed to maintain the top edge of each riser plate at the same predetermined distance below the liquid surface. By such means, an adjustable lip is provided for the collector box opening by the top edges of the riser plates, which lip is automatically maintained at an optimum level of submergence such that the proportion of oil which is suctioned for delivery to the oil/water separators remains approximately the same as that obtained by operation in calm seas or when using the collector box 17 of FIG. 1 in calm seas.

It is also to be noted that at the top edge of each of the side walls 62, there is provided a seal 91 of Neoprene or the like, one each being mounted on the top of the side wall between each pair of the guide bars 64 by a clamping gasket 92 which is attached by screws 97 or the like. The Neoprene seals 91 are in wiping sealing engagement with the riser plates 68 and each is adapted to maintain a water-tight seal with the surface of the riser plate. The seals 91 preclude the entry of sea water and oil between the walls 62 of the collector box and the riser plates 68 to insure that all liquid which enters the collector box must flow over the lip provided by the top edges of the riser plates, thus permitting a greater control of the proportional mix of oil and water which is suctioned into the collector box 60.

Aside from the linear hydraulic actuators 70 and the sensors 72 located at the collector box, all other major components of the hydraulic controls system 75 are located aboard the dredge. Electrical lines from the sensors 72 and all hydraulic lines connecting with the linear actuators 70 extend through the ducts 63 and 69, respectively, and along the ladder 15 to the computer 74 and the hydraulic reservoir 76 and pump 77 located aboard the dredge as shown in dashed lines in FIG. 2. The ducts 63 and 69 are preferably circular or rectangular in cross section.

It is to be noted that the use of a dredge and its suction pipe for cleaning up oil spills as disclosed in the invention is a unique application for a dredge in addition to such customary uses as dredging of sand, silt and vegetation and in the mining of submerged mineral deposits. The large diameter suction pipe characteristic of most suction dredges permits the recovery of oil from a marine oil slick in far greater quantities in a given time than has typically heretofore been attained. Furthermore, with a collector box constructed in accordance with the embodiment illustrated in FIGS. 3 through 6, it is possible to use the invention in seas with wave heights of six feet (1.828 m) and with little degradation of performance. The size of the collector box, the riser plates, suction pipe, and oil/water separators can obviously be varied from those described herein, for such purposes as permitting operation in seas with waves greater than six feet (1.828 m) or to provide shallower collector boxes for use in shallow bodies of water. The widths of the riser plates can also be designed much smaller than 3 ft. (0.914 m) as may be desirable for use in turbulent seas and when the wave paths are unpredictable.

For greater accuracy in determining the hydrostatic head and therefore the level of submergence below the oil/water interforce, an atmospheric pressure sensor 95 is also provided which sends an electrical signal to the computer 74 for compensating the sensor 72 signals for the effects of atmospheric pressure. The atmospheric pressure sensor 95 is mounted atop one of the guide bars 64 of the collector box as shown in FIG. 5.

Also, as a further assist to the operator, four additional pressure sensors 96, may be mounted on the respective four corner guide bars 64 at a location of equal height with the riser plate sensors 72 when in a calm sea. Each sensor 96 senses the hydrostatic head inside the collector box above the sensor 96 and when compared to a sensor 72 signal may be used to signal the operator when the collector box is too high or too low in the water.

It will also be necessary to provide additional anchor lines (not shown) for the stern of the dredge and the outside four corners of the barge array. Indicator flags, such as the flags 29, might also be provided at the corners of the collector box 60.

It is to be understood therefore that the foregoing description of the invention has been presented for purposes of illustration and explanation and is not intended to limit the invention to the precise form disclosed. For example, various other surface sensing means may be employed in lieu of hydrostatic pressure sensors a used in the embodiment of FIGS. 3 through 6. The collector box might also have a cross sectional configuration other than rectangular and the dredge itself could be replaced with a suction pipe equipped boat. To protect against suctioning debris into the suction pipe, it might also be beneficial to install a wire mesh by welded attachment to the guide bars across the opening of the collector box near the top edge of the box when in a calm sea. Furthermore, while a variety of materials might be used in construction, the side walls of the box are preferably 10 cast steel and the riser plates and guide bars preferably No. 316 stainless steel. It is to be appreciated therefore, that changes may be made by those skilled in the art without departing from the spirit of the invention.

We claim:

1. A method for recovery of oil from a marine oil slick by employing a flotation vessel equipped with a section collector box connected at the end thereof and provided with a top opening and lip defined by the edge of the box about the opening, said suction pipe being mounted by a flexible connection with said vessel for submergence of the collector box into the water below the oil slick and the collector box being mounted by a flexible connection with the suction pipe, said method comprising:

monitoring the level of submergence of a plurality of incremental portions of the lip of the suction collector box which portions comprise substantially the entire extent of said lip;

automatically maintaining each said portion of lip of the collector box at an associated selected depth directly below the oil slick whereby said lip is adapted to track the rise and fall of the slick induced by waves from any direction;

applying a suction force through said pipe to the liquid within said collector box for suctioning water and oil from said slick into said pipe in a relatively constant volume;

delivering the suctioned mixture of oil and water from the suction pipe to oil/water separation devices whereby the oil may be separated from the water by said separation devices and delivered to oil collection means for collection.

2. A method for recovery of oil from a marine oil slick as set forth in claim 1 which includes the step of anchoring and positioning said vessel adjacent the oil slick with the suction collector box disposed in the path of the oil slick as carried by the prevailing current.

3. An apparatus for the recovery and collection of oil from an oil slick formed by a marine oil spill, said apparatus comprising:

a boat having a suction pump mounted thereon;

a section pipe flexibly connected in communication with the inlet of the pump;

a suction collector box flexibly connected to said suction pipe at the distal end thereof, said collector box having a top opening and lip formed by the edge of the box which defines said opening;

means for mounting said pipe for relative movement with respect to said boat to permit the submergence o the collector box into the water below the oil slick;

means for mounting said collector box for relative pivotal movement with respect to said suction pipe;

means for controllably moving said pipe and collector box to position the collector box below the oil slick whereby energization of said pump applies a suction pressure through said pipe to the collector box for suctioning water and oil from said slick through the collector box and suction pipe;

means for sensing the rise and fall of the liquid surface above a plurality of incremental portions of said lip wherein said incremental portions extend substantially the entire length of said lip;

control means responsive to said sensing means for automatically maintaining the submergence of each said incremental portion of said lip to an associated predetermined level of submergence independent of the level of submergence of any other incremental portion and control means therefor whereby said lip is moveable in increments substantially throughout its length to track the rise and fall of the liquid surface as induced by wave action which is incident thereto from any direction with respect to said box; and oil and water separators connected in fluid communication with said pump to receive the mixture of oil and water which is suctioned through said pipe and to separate the oil from the water in said mixture whereby the oil which is separated by said separators may be conveyed to storage devices for collection.

4. An apparatus for the recovery and collection of oil from an oil slick as set forth in claim 3 wherein said boat is a dredge and said apparatus further includes means for positioning and maintaining the dredge in close proximity to the edge of the oil slick and positioning and maintaining the dredge such that the collector box is in the path of the marine current.

5. An apparatus for the recovery and collection of oil from an oil slick as set forth in claim 4 and further including:

a pair of elongate oil retainer booms, each said retainer boom being of substantially linear configuration and connected at one end to the dredge, said remainder booms being connected to the dredge on opposite sides of said suction pipe and collector box and extending from the dredge in divergent angular relationship to one another; and means for controlling the angle of divergence of the retainer booms and thereby the spacing between the distal ends of the booms for the reception and retention of the current-carried oil slick in proximity to the collector box.

6. An apparatus for the collection and recovery of oil from a marine oil slick as set forth in claim 3 wherein said apparatus includes a discharge pipe of approximately 68.58 cm in diameter which connects the outlet of the pump with the oil and water separators, said suction pipe is approximately 76.2 cm in diameter and the pump is of a size adapted to pump as much as at leatone million barrels of oil/water mixture per day from the collection box to said separators.

7. An apparatus for the recovery and collection of oil from an oil slick formed by a marine oil spill, said apparatus comprising:

a boat having a suction pump mounted thereon;

a suction pipe flexibly connected in communication with the inlet of the pump;

a suction pipe flexibly connected in communication with the inlet of the pump;

a suction collector box flexibly connected to said suction pipe at the distal end thereof, said collector box having side walls and a top opening;

means for mounting said pipe for relative pivotal movement with respect to said boat to permit the submergence of the collector box into the water below the oil slick;

means for mounting said collector box for relative pivotal movement with respect to said suction pipe., means for controllably moving said pipe and collector box to position the collector box in an upright orientation at a predetermined level of submergence whereby energization of said pump applies a suction force through said pipe to the collector box for suctioning water and oil from said slick through the collector box and suction pipe, said collector box having a plurality of elongate channeled guide members mounted to the interior surfaces of said side walls and extending thereabove;

a plurality of riser plates mounted in said guide members closely adjacent said side walls with each said riser plate being mounted between an adjacent pair of guide members and adapted for sliding movement therein, said guide members and riser plates being arranged about the inner surfaces of said side walls throughout the full extent thereof;

sensor means mounted to each said riser plate for detecting the height of the water surface above the top edge of the riser plate when the collector box is in upright orientation and for generating an electrical output signal indicative thereof; and automatic drive means responsive to each said sensor output signal to move its associated riser plate in up and down directions to maintain the top edge of each riser plate at a selected optimum distance below the marine surface whereby the top edges of said riser plates form a lip for the top opening of the collector box which is adjustable throughout its full extent for tracking the rise and fall of the water surface and said oil slick in correspondence with wave action of said surface;

oil and water separators connected in fluid communication with said pump to receive the mixture of oil and water which is suctioned through said pipe and to separate the oil from the water in said mixture; and means interconnecting with said separators for collecting the oil which is separated by said separators.

8. An apparatus for the recovery and collection of oil from an oil slick as set forth in claim 7 wherein said sensor means comprise a plurality of hydrostatic pressure sensors, each of which is mounted to a different one of said riser plates in close proximity to the top edge of the riser plate.

9. An apparatus for the recovery and collection of oil from an oil slick as set forth in claim 7 wherein said apparatus is provided with a plurality of sealing means mounted between said side walls and each said riser plate for establishing a water-tight seal therebetween such that water and oil when suctioned into said collector box must pass over the top edges of said riser plates.

10. An apparatus for the recovery and collection of oil from an oil slick as set forth in claim 7 wherein said automatic drive means includes a plurality of linear hydraulic actuators, each of which is coupled by an actuating element to a different one of each of said riser plates, and computer means responsive to said sensor output signals for generating control signals to said linear hydraulic actuators whereby each riser plate is moved to maintain the top edge thereof at a selected optimum distance below the oil and water interface as it rises and falls with wave action.

11. An apparatus for the collection and recovery of oil from a marine oil slick as set forth in claim 7 wherein said boat is a dredge and said suction pipe is a dredge suction pipe.

12. An apparatus for the collection and recovery of oil from a marine oil slick as set forth in claim 11 further including one or more barges positioned closely adjacent the dredge with said oil and water separators being mounted on said one or more barges.

13. An apparatus for the collection and recovery of oil from a marine oil slick as set forth in claim 11 wherein said apparatus includes an inlet manifold which connects in fluid communication with the inlets of the separators, said inlet manifold including flexible connectors between said barges; and
   conduit means for connecting the discharge end of said pump with said manifold, said conduit means including a flexible connecting portion for connecting to the inlet manifold on said barges.

14. An apparatus for the recovery and collection of oil from an oil slick as set forth in claim 4 further including anchoring means for anchoring the dredge in close proximity to the edge of the oil slick and positioning the dredge such that the collector box is in the path of the marine current.

15. An apparatus for the recovery and collection of oil from an oil slick as set forth in claim 14 and further including:
   a pair of elongate oil retainer floats, each said retainer float being of substantially linear configuration and connected at one end to the dredge, said retainer float being connected to the dredge on opposite sides of said suction pipe and collector box and extending from the dredge in divergent angular relationship to one another for the reception and retention of the current-carried oil slick in proximity to the collector box.

16. An apparatus for the recovery and collection of oil from an oil slick formed by a marine oil spill, said apparatus comprising:
   a boat having a suction pump mounted thereon;
   a suction pipe flexibly connected in communication with the inlet of the pump;
   a suction collector box flexibly connected to said suction pipe at the distal end thereof, said collector box having side walls and a top opening;
   means for mounting said pipe for relative movement with respect to said boat to permit the submergence of the collector box into the water below the oil slick;
   means for controllably moving said pipe and collector box to position the collector box in a substantially upright orientation at a predetermined level of submergence whereby energization of said pump applies a suction force through said pipe to the collector box for suctioning water and oil from said slick through the collector box and suction pipe, said collector box having a plurality of elongate channeled guide members mounted to said sidewalls and extending thereabove;
   a plurality of riser plates mounted in said guide members closely adjacent said side walls with each said riser plate being mounted between an adjacent pair of guide members and adapted for sliding movement therein, said guide members and riser plates being arranged about said side walls throughout the full extent thereof;
   sensor means mounted to each said riser plate for detecting the height of the water surface above the top edge of the riser plate when the collector box is in substantially upright orientation and for generating an electrical output signal indicative thereof;
   automatic drive means responsive to each said sensor output signal to move its associated riser plate in up and down directions to maintain the top edge of each riser plate at an associated selected optimum distance below the marine surface whereby the top edges of said riser plates form a lip for the top opening of the collector box which is adjustable throughout its full extent for tracking the rise and fall of the water surface and said oil slick in correspondence with wave action of said surface; and
   means connected in fluid communication with said pump to receive the mixture of oil and water which is suctioned through said pipe whereby the oil in said mixture may be separated from the water and delivered to storage devices for collection.

* * * * *